United States Patent [19]

Conway

[11] Patent Number: 4,557,451
[45] Date of Patent: Dec. 10, 1985

[54] BINOCULAR RESTS

[76] Inventor: Joseph Conway, 50 Tower Rd., Newton, Mass. 02164

[21] Appl. No.: 648,488

[22] Filed: Sep. 10, 1984

[51] Int. Cl.[4] ............................................. F16M 11/04
[52] U.S. Cl. .................................... 248/187; 248/177; 248/DIG. 2; 206/316; 224/909
[58] Field of Search ................. 248/187, 186, DIG. 2, 248/154, 177, 103, 104, 105, 131, 152, 176, 309.1, 310, 311.2, 313, 500, 505; 24/3 R, 306; 224/909; 206/316

[56] References Cited

U.S. PATENT DOCUMENTS

| 931,692 | 7/1961 | Bothos | 248/309.1 |
|---|---|---|---|
| 1,232,690 | 7/1917 | Keenan | 248/103 |
| 2,149,615 | 3/1939 | McElwee | 248/105 |
| 2,450,927 | 10/1948 | Allen | 248/105 |
| 2,451,718 | 10/1948 | Corrao | 248/105 |
| 2,451,846 | 10/1948 | Love | 248/105 |
| 2,936,992 | 5/1960 | Browning | 248/313 |
| 2,991,967 | 8/1961 | Fyfe | 248/187 |
| 3,071,410 | 1/1963 | Gaskins | 248/153 |
| 3,133,719 | 5/1964 | Beck | 248/187 |
| 3,281,106 | 10/1966 | Bogdanovich | 206/316 |
| 3,423,056 | 1/1969 | Welt | 248/187 |
| 4,046,345 | 9/1977 | Boyd, Sr. | 248/310 |
| 4,063,704 | 12/1977 | Rother | 248/176 |
| 4,136,805 | 1/1979 | Storms | 248/310 |

Primary Examiner—J. Franklin Foss
Assistant Examiner—Robert A. Olson
Attorney, Agent, or Firm—Paul L. Hickman

[57] ABSTRACT

A binocular rest characterized by an elongated support member, a strap for holding a pair of binoculars upon the support member, and a mounting nut for attaching the support member to a tripod. The support member has an upper surface configured to engage the lower surfaces of the binoculars, and the strap attaches over the binoculars to hold them against the contoured upper surface of said support member and to urge winged end portions of the support member against the side surfaces of the binoculars.

6 Claims, 6 Drawing Figures

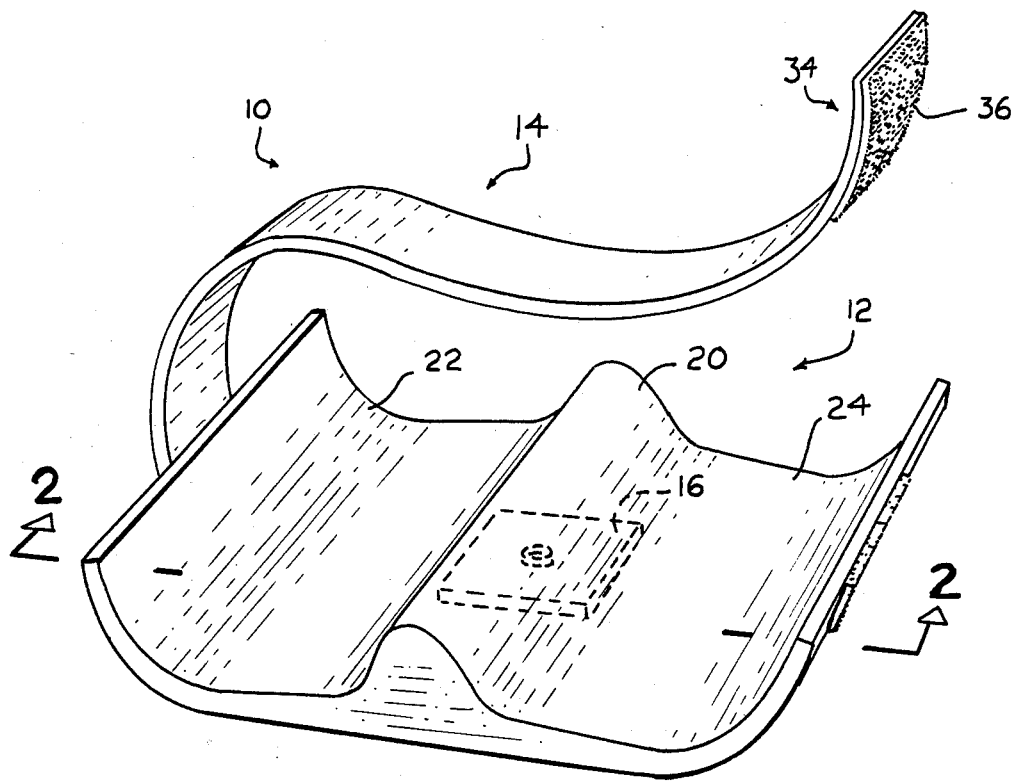
FIG-1-
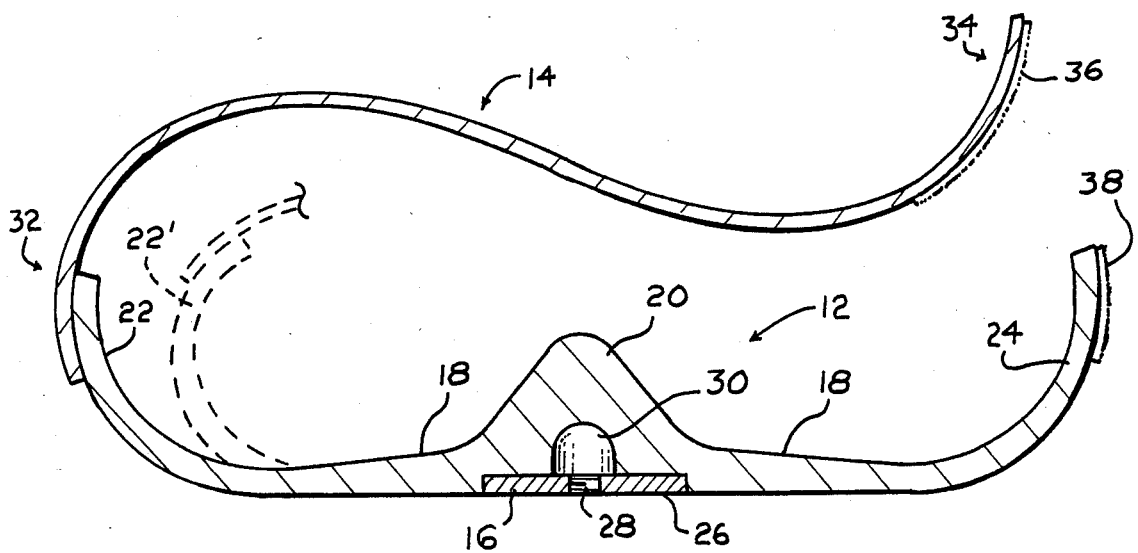
FIG-2-

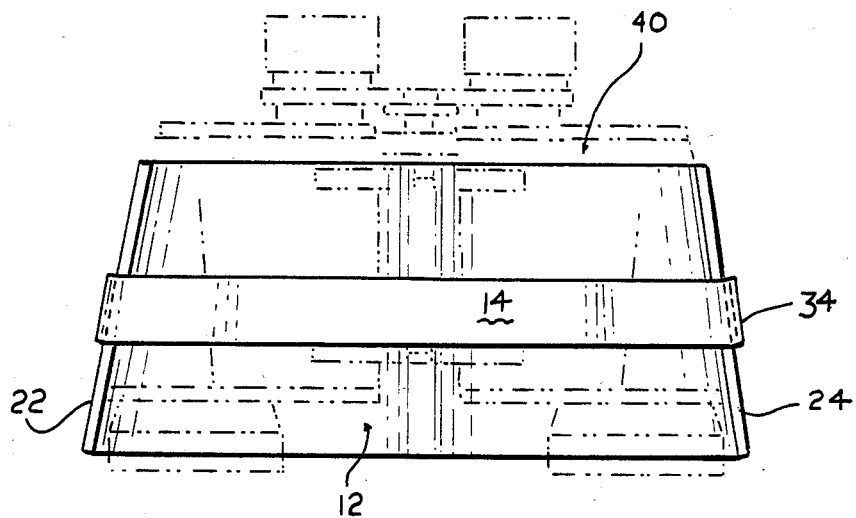
FIG-3-
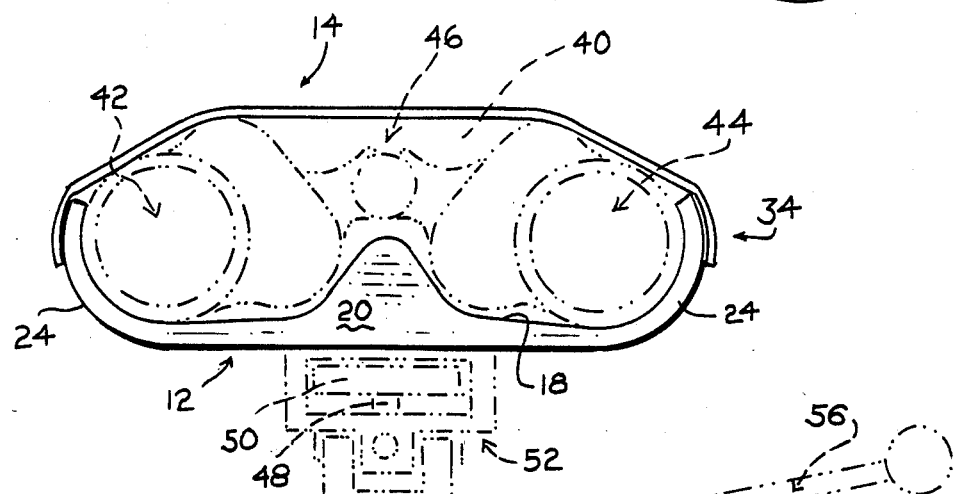
FIG-4-

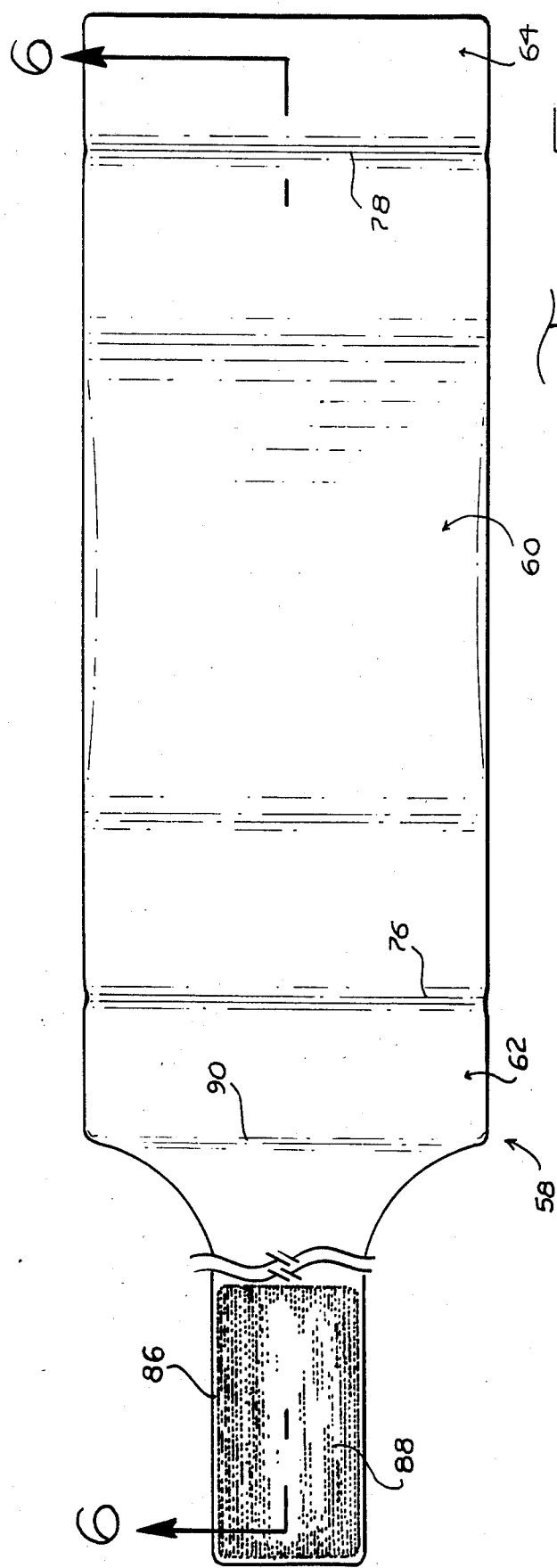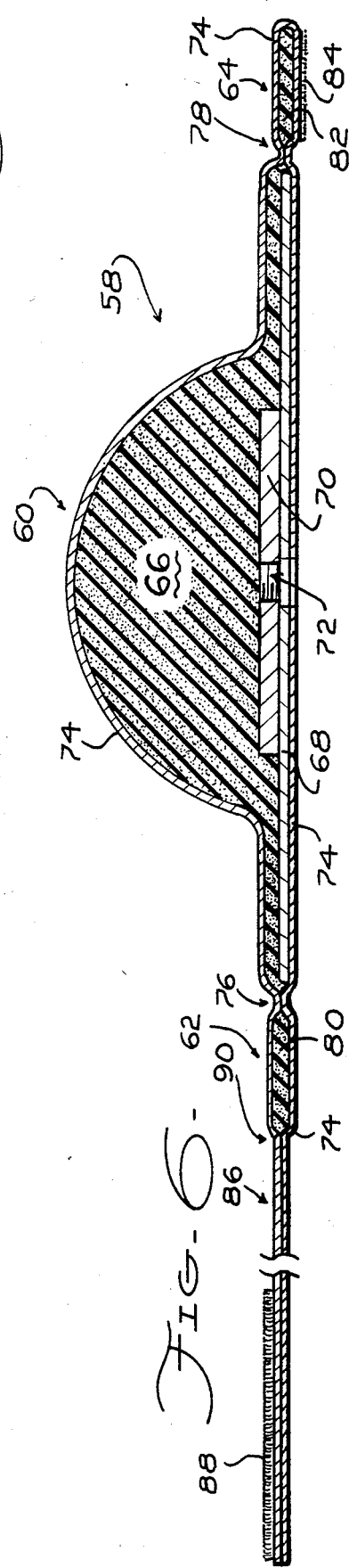

BINOCULAR RESTS

BACKGROUND OF THE INVENTION

1. Field of the Invention

This invention relates generally to mounts for optical devices, and more particularly to mounting systems for binoculars.

2. Description of the Prior Art

Binoculars consisting of a pair of monocular units attached together by a hinge and focusing mechanism are well known. Binoculars are usually hand held and are often used to quickly survey an area by panning the field of view of the binoculars across the terrain.

A problem is encountered when the binoculars are trained upon a stationary or semi-stationary object. Since even the steadiest of hands shake somewhat, the field of view will likewise have tremors, making it more difficult to view the desired object. Furthermore, the tremors in the field of view can be quite fatiguing for the user of the binoculars.

In U.S. Pat. No. 3,133,719 of Beck a support for optical devices is described including an elongated, vertical column provided with a clamp at an upper end thereof and a mount at a lower end thereof. While suitable for some applications, Beck's does not hold a pair of binoculars in as stable a manner as could be desired.

What the prior art fails to disclose, then, is a simple, inexpensive rest for binoculars.

SUMMARY OF THE INVENTION

The major object of this invention is to provide a simple, inexpensive binocular rest.

A further object of this invention is to provide a device which securely attaches a pair of binoculars to a standard tripod.

Briefly, the invention comprises a support member having a contoured or deformable upper surface configured to engage a lower surface of a pair of binoculars, a strap for attaching the binoculars to the contoured upper surface, and mount for attaching the support member to a tripod.

The upper surface of the support member is designed to maximize contact area with the binoculars irregardless, within limits, of their shape and size. The support member has flexible end portions which can wrap partially around the sides of the binoculars to prevent them from moving laterally. Due to the adjustability of the end portions, the support member can be used with many different models of binoculars.

An advantage of this invention is that it can securely attach a pair of binoculars to a tripod.

Another advantage is that many different shapes and sizes of binoculars can be used with the present invention.

Yet another advantage of this invention is that it can be inexpensively produced by mass production techniques.

These and other objects and advantages of the present invention will no doubt become apparent upon a reading of the following descriptions and a study of the several figures of the drawing.

BRIEF DESCRIPTION OF THE DRAWING

FIG. 1 is a perspective view of a binocular rest in accordance with the present invention;

FIG. 2 is a cross section taken through line 2—2 of FIG. 1;

FIGS. 3 and 4 are top plan and front elevation views, respectively, illustrating the operation of the present invention;

FIG. 5 is a top plan view of another embodiment of this invention; and

FIG. 6 is a cross section taken through line 6—6 of FIG. 5.

DETAILED DESCRIPTION OF THE PREFERRED EMBODIMENT(S)

Referring to FIG. 1, a binocular rest 10 includes a support member 12, a flexible strap 14, and a mount 16. The binocular rest 10 is designed to attach binoculars of various shapes and sizes to the standard camera mount of a tripod.

Referring additionally to the cross-section of FIG. 2, support member 12 includes an undulating upper surface 18 configured to engage and support the lower surfaces of a pair of binoculars. The upper surface 18, which is somewhat W shaped in cross section, includes a central hump portion 20 and two flexible side wing portions 22 and 24.

Support member 12 is preferably made from a material having a high coefficient of friction so as to provide a non-skid upper surface 18. Alternatively, support member 12 may be made from a material which does not have a particularly high co-efficient of friction, which is then treated, covered, or coated to increase the coefficient of friction of upper surface 18. Preferably, support member 12 is made from a semi-hard synthetic rubber material.

Referring more particularly to the cross section of FIG. 2, an approximately 1" inch square reinforcement plate 26 is provided with a threaded bore 28. The threaded bore is preferably provided with $\frac{1}{4} \times 20$ threads so that it may engage the threaded stud of a standard tripod's camera mount. A void 30 is provided in central hump portion 20 of support member 12 to receive the end of the threaded stud of the tripod's camera mount. Reinforcement plate 26 provides additional rigidity to support member 12 for stable attachment to the tripod.

Side wing portions 22/24 are flexible so that they may partially wrap around and conform to the side surfaces of a pair of binoculars. As suggested by the broken lines at 22', various widths of binoculars can be accommodated by the support member 12 of the present invention. It has been found that if wing portions 22/24 are approximately $1\frac{1}{2}$" high, that most binoculars can be accommodated by the present invention.

Strap 14 is an elongated, flexible member made from any suitable material such as a woven fabric or a stretch fabric. A first end 32 of strap 14 is attached to side wing portion 22, and a second end 34 is removably attachable to side wing portion 24 by means of a pair of cooperating members 36 and 38. Preferably, these cooperating members are mating strips of VELCRO(tm).

Support member 12 has a substantially rectangular base which is preferably approximately $3\frac{1}{2}" \times 6\frac{1}{2}"$ in size. Strap 14 is approximately 9" long and has a $1\frac{1}{2}"$ width, which widens to 2" at its point of attachment to side wing portion 22. VELCRO member 36 is approximately 3" in length, and VELCRO member 38 is approximately 1" square.

The operation of the present invention will be discussed with reference to FIGS. 3 an 4. A pair of binoculars 40 having two monocular elements 42 and 44 attached together by a hinge and focusing assembly 46 rests upon upper surface 18 of support member 12. Strap 14 is stretched across the upper surfaces of binoculars 40 and has its end 34 engaged with side wing portion 24. The strap pulls the side wing portions 22/24 firmly into contact with binoculars 40 to cause the side wing portions to closely imitate the surface configuration of the sides of binoculars 40. In FIG. 3, which is slightly exaggerated to show detail, support member 12 shows a distortion from its normal rectangular base shape to a truncated triangular base shape as wing portions 22 and 24 deform to the taper of binoculars 40. This deformation of wing portions 22 and 24 along with the configuration of the remainder of surface 18 increases the contact surface area between support member 12 and binoculars 40 to provide a secure and steady attachment of the binoculars to the tripod.

Referring again to FIG. 4, a threaded stud 48 attached to a thumb wheel 50 engages the threaded bore 28 of reinforcement plate 26. The threaded stud 48 and thumb wheel 50 are part of a camera mount 52 of a tripod assembly 54. When attached to a tripod in this manner the binoculars 40 can be pointed in many directions as controlled by a tripod lever 56 to provide a clear, steady view through the binoculars.

In FIGS. 5 and 6, a alternate binocular rest 58 in accordance with the present invention includes a central portion 60, and two side portions 62 and 64 provided at opposing ends of central portion 60. Central portion 60 is provided with a soft, pliable, deformable foam core 66 which permits the central portion 60 to deform to the shape of the underside of a pair of binoculars.

A rigid support plate 68, preferably having dimensions of approximately 3×6×⅛ inches, is provided beneath foam core 66 to provide rigidness to the binocular rest. A 3×3×¼ inch center block 70 is attached to an upper surface of support plate 68. A threaded bore 72 is provided through both support plate 68 and center block 70 to receive the threaded stud of a camera mount.

A skin 74 made from vinyl, molded plastic, synthetic rubber, leather, or other materials covers core 66, support plate 68, and the remainder of the binocular rest 58. Skin 74 is sewn or otherwise attached together to form live hinges 76 and 78 to permit side portions 62/64 to bend away from the plane of support plate 68. Preferably, side portions 62/64 are provided with foam inserts 80 and 82 to give body to the side portions. The overall length of binocular rest 58 is preferably about 18 inches.

As best seen in FIG. 6, the skin 74 completely encircles insert 82, and has a VELCRO fastener attached to its undersurface. The skin 74 encapsulates insert 80 but also extends outwardly from side portion 62 to form a strap 86 to which a mating VELCRO fastener may be attached. The juncture between strap 86 and side portion 62 forms a third live hinge 90.

The use of binocular rest 58 is substantially identical to the use of binocular rest 10. After the support plate 68 and center block 70 are attached to the camera mount of a tripod, a pair of binoculars are placed upon central portion 60 of the binocular rest. Strap 86 is tightened over the top of the binoculars and strips 84 and 88 are engaged to firmly hold the strap in place. Central portion 60 deforms to the shape of the underside of the binoculars, and side portions 62 and 64 firmly and conformingly engage the side portions of the binoculars.

While this invention has been described in terms of a few preferred embodiments, it is contemplated that persons reading the preceding descriptions and studying the drawing will realize various alterations, permutations and modifications thereof. It is therefore intended that the following appended claims be interpreted as including all such alterations, permutations and modifications as fall within the true spirit and scope of the present invention.

What is claimed is:

1. In a binocular apparatus of the type including a binocular having a first monocular assembly and a second monocular assembly, and a support assembly coupled to said binocular to hold said binocular steady; wherein the improvement comprises a support assembly including:
   an elongated body having a flexible first end portion and a flexible second end portion, said body being provided with a transversely extending hump centrally located between said first end portion and said second end portion which is adapted to engage both said first monocular assembly and said second monocular assembly along a substantial portion of their length, wherein said flexible first end portion is adapted to engage at least partially around and conform to the shape of said first monocular assembly and wherein said flexible second end portion is adapted to wrap at least partially around and conform to the shape of said second monocular assembly, said second flexible end portion being provided with a first cooperating fastener;
   mounting means attached to a surface of said elongated body opposite said hump, said mounting means including a nut provided with a threaded bore; and
   an elongated, flexible strap having a first end attached to said first end portion of said elongated body, a second end, and a second cooperating fastener attached to said second end, said second cooperating fastener being removably engaged with said first cooperating fastener, said strap adapted to wrap said first flexible end portion against said first monocular assembly, said second flexible end portion against said second monocular assembly, said strap adapted to urge both said first monocular assembly and said second monocular assembly against opposing sides of said hump.

2. An improved support assembly as recited in claim 1 wherein said first flexible end portion and said second flexible end portion curl upwardly towards said hump when disengaged from said first monocular assembly and said second monocular assembly, respectively.

3. An improved support assembly as recited in claim 1 wherein both said first flexible end portion and said second flexible end portion include at least one hinged section.

4. An improved support assembly as recited in claim 1 wherein said elongated body is made from a solid piece of flexible material.

5. An improved support assembly as recited in claim 1 wherein said elongated body includes a resilient core surrounded by a flexible skin.

6. An improved support assembly as recited in claim 5 further comprising a support plate disposed between said resilient core and said flexible skin proximate said mounting means.

* * * * *